United States Patent [19]

Shaver

[11] Patent Number: 4,644,903
[45] Date of Patent: Feb. 24, 1987

[54] AUTOMATIC ANIMAL FEEDER

[76] Inventor: Richard Shaver, 1899 Haig, Montreal, Quebec, Canada, H1N 3E1

[21] Appl. No.: 740,544

[22] Filed: Jun. 3, 1985

[51] Int. Cl.⁴ .............................................. A01K 5/02
[52] U.S. Cl. ................................ 119/51 R; 119/51.12
[58] Field of Search .............. 119/51 R, 51.11, 51.12, 119/51.14

[56] References Cited

U.S. PATENT DOCUMENTS

| | | | |
|---|---|---|---|
| 3,137,272 | 6/1964 | Lepper | 119/51.12 |
| 3,187,722 | 6/1965 | Gilmore et al. | 119/51 R X |
| 3,532,075 | 10/1970 | Cooper | 119/51.12 |
| 3,935,837 | 2/1976 | Mulhern | 119/51.12 |
| 4,164,200 | 8/1979 | Gambling | 119/51.12 |

Primary Examiner—Robert P. Swiatek
Attorney, Agent, or Firm—Swabey, Mitchell, Houle, Marcoux & Sher

[57] ABSTRACT

An automatic animal feeder for automatically exposing feed at predetermined substantially regular intervals, comprises a frame having a base portion and an upwardly extending rear portion, at least two feeding troughs arranged side-by-side in the base portion and adapted to contain animal food, and a lid associated with a respective one of the feeding troughs, the lid being movable between open and closed positions and normally biased toward the open position. A retention element is associated with a respective lid for retaining same in the closed position, and a liquid-operated release mechanism is asociated with a respective retention element the release mechanism including a chamber with an inlet for receiving a liquid and being operative to release the respective retention element when the liquid reaches a predetermined level in the chamber, the chamber having liquid discharge for emptying same after use.

23 Claims, 7 Drawing Figures

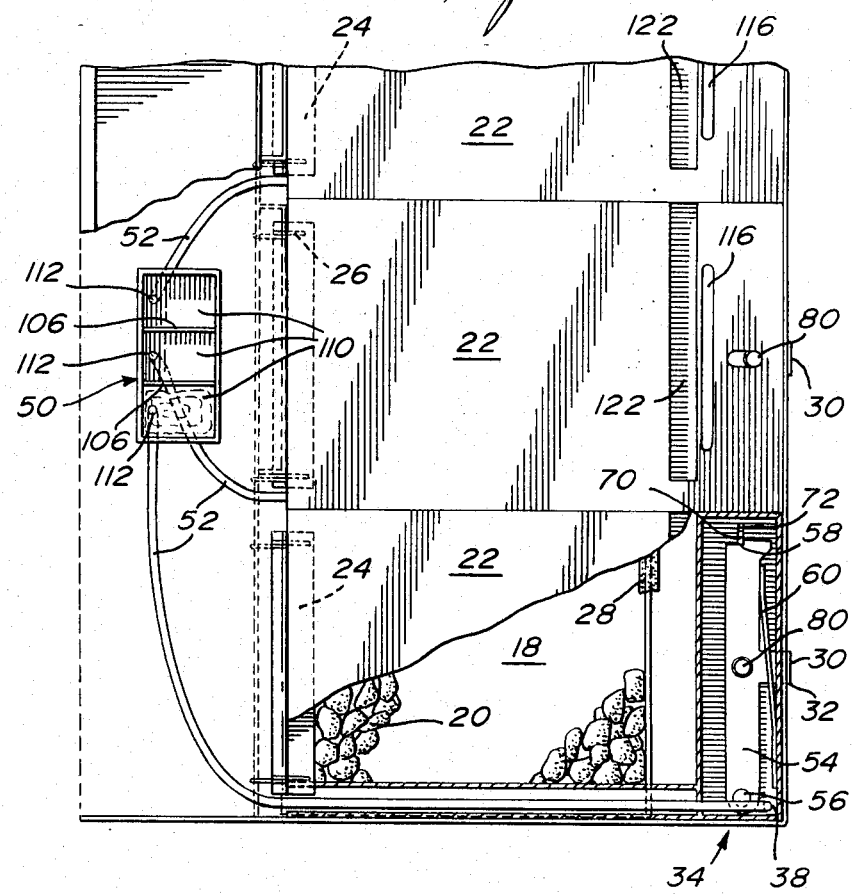
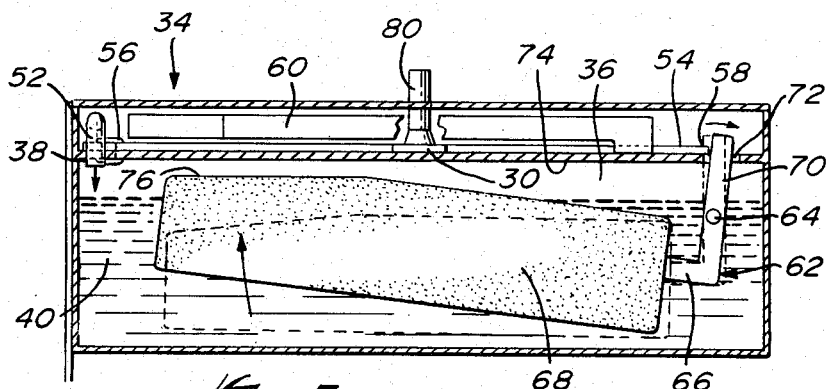

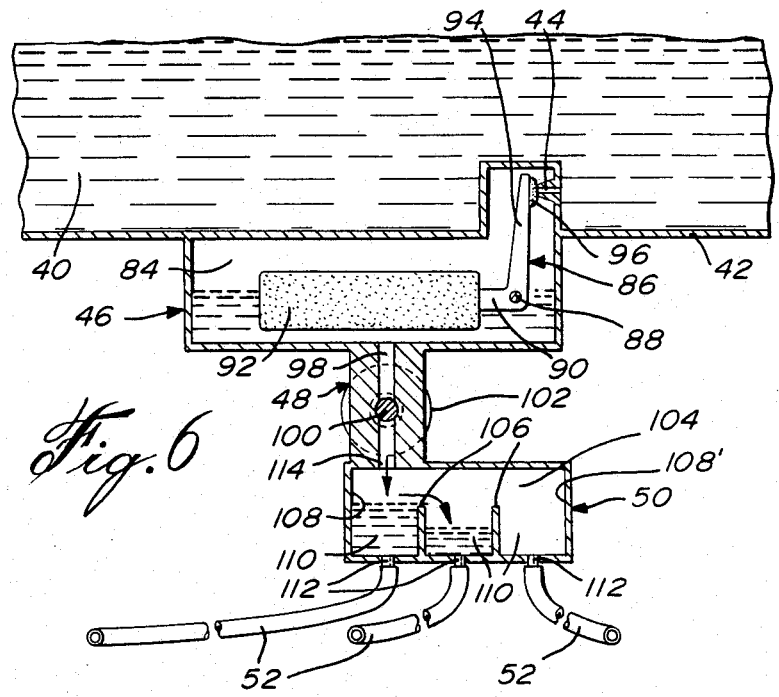
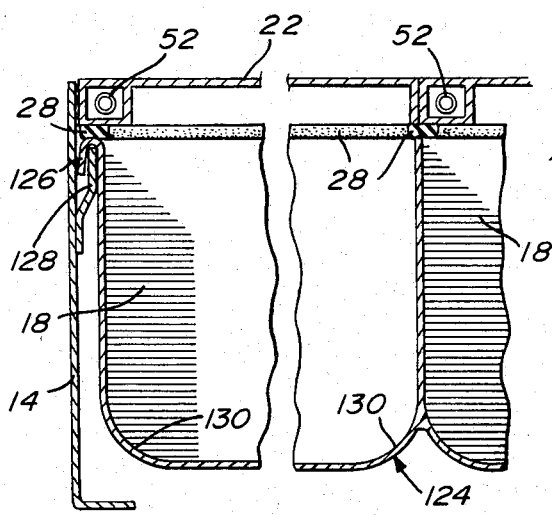
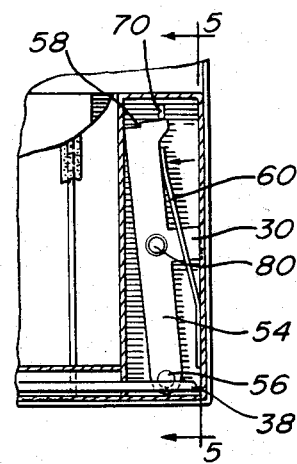

AUTOMATIC ANIMAL FEEDER

BACKGROUND OF THE INVENTION

The present invention relates to an automatic animal feeder and, more particularly, to an animal feeder for automatically exposing feed at predetermined substantially regular intervals.

In many households, pets are usually left alone all day or over weekends because their owner must leave the house for work or a trip. These pets are generally provided with their feed for the day in a single large portion, which is not very healthy for the animal. As it is known, animals must be fed at substantially regular intervals in order to have a regular diet and thus be healthy. This applies not only to domestic animals, but also to farm animals, laboratory animals, animals kept in a kennel or at a veterinary as well as to watch dogs.

Various clock-timed animal feeders are known but these require external energy such as electricity in order to function. Thus, in the case of a power failure, the timing mechanism can be affected and result in erroneous time intervals. Such devices also consume energy.

SUMMARY OF THE INVENTION

It is therefore an object of the present invention to overcome the above drawbacks and to provide a self-contained, automatic animal feeder which does not require nor consume external energy and which can expose feed at predetermined substantially regular intervals for consumption by an animal during absence of the owner.

In accordance with the present invention, there is provided an automatic animal feeder for automatically exposing feed at predetermined substantially regular intervals, comprising a frame having a base portion and an upwardly extending rear portion, at least two feeding troughs arranged side-by-side in the base portion and adapted to contain animal food, and a lid associated with a respective one of the feeding troughs, the lid being movable between open and closed positions and normally biased toward the open position. A retention means is associated with a respective lid for retaining same in the closed position and a liquid-operated release mechanism is associated with a respective retention means, the release mechanism including a chamber with an inlet for receiving a liquid and being operative to release the respective retention means when said liquid reaches a predetermined level in the chamber, the chamber having liquid discharge means for emptying same after use. The animal feeder of the invention further includes a liquid feed tank adapted to contain the liquid, the feed tank having an outlet and being arranged in the rear portion of the frame to enable the liquid to flow by gravity through the outlet, and liquid supplying means interconnecting the tank outlet with the chamber inlet of a respective release mechanism for successively supplying the liquid to the respective chambers so as to successively release the associated retention means and cause successive opening of the associated lids, thereby exposing the animal food at predetermined substantially regular intervals corresponding to the time required for the liquid to fill a respective chamber to the predetermined level.

According to a preferred embodiment of the invention, the lid is hinged to the frame for pivotal movement between an open substantially vertical position and a closed substantially horizontal position, and the retention means and associated release mechanism are fixed to the lid so as to be movable therewith between these substantially vertical and horizontal positions.

Preferably, the liquid supplying means comprise a liquid directing valve having an inlet connected to the tank outlet and separate feed outlets each associated with a respective chamber inlet, and separate conduits each connecting a respective feed outlet to an associated chamber inlet. The chamber of a respective release mechanism when in the substantially vertical position is disposed at a height such as to prevent the liquid directing valve from supplying further liquid to the chamber. The liquid directing valve is preferably formed with at least two liquid overflow compartments each provided with a respective feed outlet, the inlet of the liquid directing valve opening into one of the overflow compartments. This allows the liquid to first flow into the one compartment, through its respective feed outlet and the conduit connecting same to an associated chamber inlet so as to activate the release mechanism of an associated retention means and thereby cause the opening of the associated lid, the liquid being then prevented from further flowing through the conduit toward the associated chamber inlet such that a portion of the liquid in the conduit flows back to the one compartment to completely fill same and thereby cause additional liquid flowing from the tank outlet in the thus filled one compartment to overflow into an adjacent compartment.

In order to adjust the predetermined intervals at which the animal food may be exposed, a flow regulating valve is advantageously connected brtween the tank outlet and the liquid directing valve for adjusting the flow rate of the liquid flowing from the feed tank to the liquid directing valve. A pressure control valve is preferably connected between the tank outlet and the flow regulating valve for providing a substantially constant head of liquid upstream of the flow regulating valve and thus preventing the predetermined intervals from varying as a result of liquid evaporating from the feed tank.

According to another preferred embodiment, the retention means comprises a latch element engageable in a corresponding cavity formed in the frame. The liquid-operated release mechanism, on the other hand, preferably comprise a pivoted member fixed to the latch element and normally biased toward a latch disengaging position, and a double-arm lever pivotally mounted inside the chamber and having one arm connected to a float element and another arm engageable with the pivoted member to retain same in a latch engaging position with the latch element engaged in the cavity. The other arm is pivotally movable in a direction away from the member to disengage therefrom in response to an upward displacement of the float element caused by the liquid filling the chamber to the predetermined level, thereby causing the member to pivotally move to the latch disengaging position with the latch element being disengaged from the cavity.

In a further preferred embodiment, means are provided for recycling the liquid discharged from the chamber of a respective release mechanism by the liquid discharge means back to the feed tank. To this end, the liquid discharge means preferably comprises a drainage port in liquid flow communication with the chamber of a respective release mechanism to allow the liquid to drain from the chamber when the respective release mechanism is in the substantially vertical position, and the liquid recycling means comprise an inlet opening associated with a respective drainage port, the inlet opening being formed in a forwardly facing wall of the frame rear portion and being in liquid flow communication with the feed tank, and a liquid trough immediately below the inlet opening for channeling the liquid drained from the chamber through the inlet opening and into the feed tank. The liquid trough is adapted to project into a corresponding recess formed in the lid such that when the respective release mechanism is in the substantially vertical position the drainage port is disposed immediately above the liquid trough.

The automatic animal feeder of the invention can be used not only indoors but also outdoors and will thus protect the animal food from adverse weather conditions such as rain. It may also be used in winter but adding an anti-freeze to the liquid contained in the feed tank, which usually consists of water.

BRIEF DESCRIPTION OF THE DRAWINGS

Further features and advantages of the invention will become more readily apparent from the following description of a preferred embodiment thereof as illustrated by way of example in the accompanying drawings, in which:

FIG. 3 is a fragmentary part-sectional plan view of the animal feeder of FIG. 1;

FIG. 4 is a view similar to FIG. 3 illustrating details of the lid retention means and associated release mechanism;

FIG. 5 which is on the same sheet of drawings as FIG. 3 is a sectional view taken along line 5—5 of FIG. 4;

FIG. 6 is another sectional view taken along line 6—6 of FIG. 2; and

FIG. 7 is a further sectional view taken along line 7—7 of FIG. 2.

DESCRIPTION OF PREFERRED EMBODIMENTS

Figure 1:
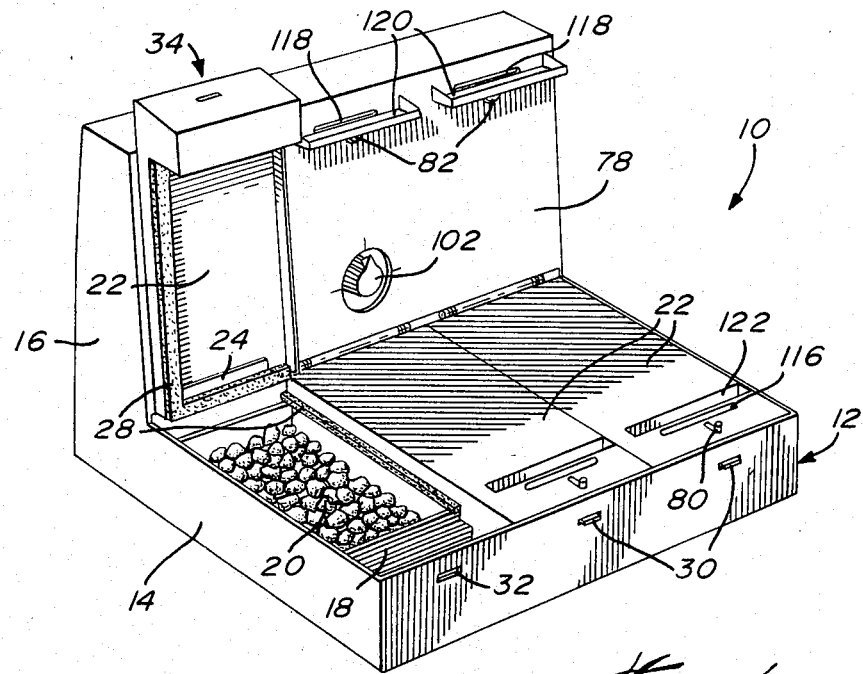
FIG. 1 is a perspective view of an automatic animal feeder according to the invention.
Figure 2:
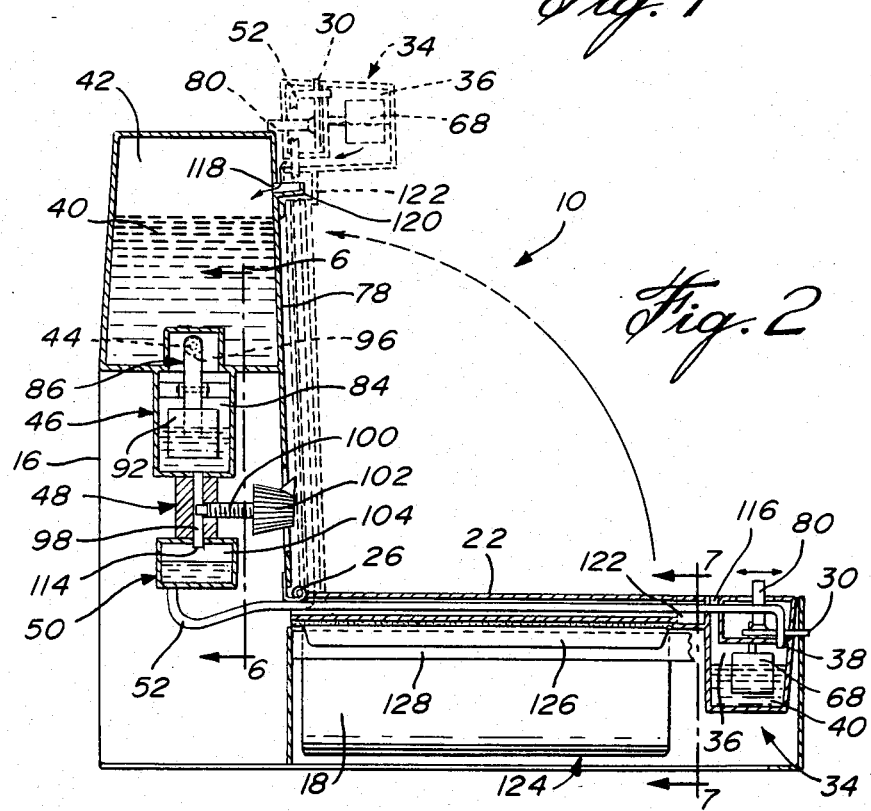
FIG. 2 is a sectioned elevational view of the animal feeder shown in FIG. 1.

Referring to the drawings, and more particularly to FIGS. 1-3 thereof, there is shown an automatic animal feeder which is generally designed by reference numeral 10 and comprises a frame 12 having a base portion 14 and an upwardly extending rear portion 16, and three feeding troughs 18 arranged side-by-side in the base portion 14 and adapted to contain animal food 20. A lid 22 of rectangular configuration is associated with a respective feeding trough 18 and is hinged at one end to the frame 12 by means of a spring-loaded hinge 24 for pivotal movement between an open substantially vertical position and a closed horizontal position. The spring-loaded hinges 24 which are provided with a torsion spring 26 normally biase the lids 22 toward the open substantially vertical position. Rubber seal members 28 are arranged between the peripheral edge of each feeding trough 18 and its associated lid 22 so as to substantially hermetically seal the troughs 18 when the lids 22 are in the closed position.

A lid retention means consisting of a latch element 30 engageable in a corresponding cavity 32 formed in the frame 12 for retaining each lid 22 in the closed position as well as a liquid-operated latch release mechanism 34 are arranged at the free end of each lid 22 so as to be movable therewith between the substantially vertical and horizontal positions. The latch release mechanism 34 includes a chamber 36 with an inlet 38 for receiving a liquid 40 such as water and is operative to disengage the latch element 32 when the liquid reaches a predetermined level in the chamber 36. A feed tank 42 having an outlet orifice 44 and adapted to contain the water or other suitable liquid 40 serving to activate the mechanism 34 is arranged in the frame rear portion 16 at a suitable height to enable the liquid 40 to flow by gravity through the outlet orifice 44. A pressure control valve 46 is connected to the tank outlet 44 and is coupled to a flow regulating valve 48 which is in turn coupled to a liquid directing valve 50. The liquid directing valve 50 is operative to successively supply liquid 40 via separate conduits 52 to the respective chambers 36 so as to successively disengage the latch elements 30 and cause successive opening of the lids 22, thereby exposing the animal food at predetermined substantially regular intervals corresponding to the time required for the liquid 40 to fill a respective chamber 36 to the predetermined level. On the other hand, the flow regulating valve 48 serves to adjust the flow rate of the liquid 40 flowing into the liquid directing valve 50 and to thereby adjust the predetermined intervals, whereas the pressure control valve 46 serves to provide a substantially constant head of liquid upstream of the valve 48.

As illustrated in FIGS. 3-5, the liquid-operated latch release mechanism 34 comprises an elongated member 54 formed integral with the latch element 30 and pivotally mounted outside the chamber 36 by means of a pivot pin 56. The member 54 which comprises a notch 58 at its free end is normally biased toward a latch disengaging position by means of a leaf spring 60. The mechanism 34 further includes a double-arm lever 62 pivotally mounted inside the chamber 36 at 64 and having one arm 66 connected to a float element 68 and another arm 70 extending exteriorly of the chamber 36 through an opening 72 to engage with the notch 58 for retaining the member 54 in a latch engaging position with the latch element 30 engaged in the cavity 32, against the force exerted by the spring 60. As best shown in FIGS. 4 and 5, the arm 70 is pivotally movable in a direction away from the notch 58 to disengage therefrom in response to an upward displacement of the float element 68 caused by the liquid 40 filling the chamber 36 to the predetermined level, thereby causing the member 54 to pivotally move to the latch disengaging position with the latch element 30 being disengaged from the cavity 32. In order to allow the float element 68 to clear the inner top surface 74 in its upward displacement, the float element 68 is advantageously provided with a bevelled edge 76. As a result, the lid 18 is pivoted upwardly by the force exerted by spring 26 to abut against the forwardly facing wall 78 of the frame rear portion 16 in the open substantially vertical position shown in broken lines in FIG. 2. The member 54 is conveniently provided intermediate the ends thereof with a manually operated latch engaging pin 80 extending exteriorly of the lid 18 for manually moving the member 54 in the latch engaging position to re-engage the latch element 30 in the cavity 32. Rubber elements 82 may provided on the wall 78 so as to cushion the impact of the lid 18 against the wall.

Turning to FIG. 6, the pressure control valve 46 is formed with a float chamber 84 and includes a double-arm lever 86 pivotally mounted inside the chamber 84 at 88, the lever 86 having one arm 90 connected to a float element 92 and another arm 94 provided with an orifice closing element 96 engageable with the outlet orifice 44 of the tank 42 to normally close same. The arm 94 is pivotally movable in a direction away from the outlet orifice 44 to open same in response to a downward displacement of the float element 92 caused by a falling liquid level in the chamber 84, so as to admit additional liquid 40 in the chamber 84 and thereby maintain a substantially constant liquid level. The flow regulating valve 48, on the other hand, is formed with a passageway 98 allowing passage of the liquid 40 from the pressure control valve 46 to the liquid directing valve 50 and includes a plunger 100 which is movable in and out of the passageway 98 to adjustably restrict the flow of the liquid passing through the passageway. Adjustment can be conveniently effected by means of the dial knob 102 connected to the plunger 100 so as to provide a drip-flow of liquid into the valve 50.

With respect to liquid directing valve 50, this valve has a chamber 104 provided with two overflow partition walls 106 arranged between the inner sidewalls 108 and 108' and defining therewith three liquid overflow compartments 110. Each overflow compartment 110 is provided with a respective feed outlet 112 which is connected to an associated chamber inlet 38 of a latch release mechanism 34 by means of conduit 52, as best shown in FIG. 3. As illustrated in FIG. 6, the inlet 114 of the valve 50 opens into one of the compartments 110 so as to allow the liquid 40 to first flow into such a compartment, through its respective feed outlet 112 and the conduit 52 connecting same to its associated chamber inlet 38 so as to activate the release mechanism 34 and thereby cause the opening of the associated lid 18. When the lid 18 with the mechanism 34 are moved to the substantially vertical position shown in broken lines in FIG. 2, the chamher 36 of the mechanism 34 is located above the valve 50 so that further supply of liquid to the chamber 36 through the conduit 52 is prevented. The internal diameter and length of the conduit 52 are such that a portion of the liquid remaining in the conduit 52, which flows back to the compartment 110 due to hydrostatic pressure, completely fills the latter. As the liquid continues to drip from the valve 48 into the thus filled compartment 110, it then overflows into an adjacent compartment to similarly activate the next latch release mechanism, thereby causing opening of the next lid at an interval corresponding to the time required for the liquid to fill the chamber 36 of the next release mechanism to the predetermined level, which is a function of the adjustment of the valve 48.

In order to empty the chambers 36 after use and reset the mechanism 34, each chamber 36 is provided with a liquid discharge means consisting of a drainage port 116 which allows the liquid to drain from the chamber 36 when the mechanism 34 is in the substantially vertical position shown in broken lines in FIG. 2. The liquid discharged from the chamber 36 is conveniently recycled back to the feed tank 42 by means of an inlet opening 118 which is formed in the wall 78 and is in liquid flow communication with the feed tank 42, and a liquid trough 120 located immediately below the inlet opening 118 for channeling the liquid drained from the chamber 36 through the opening 118 and into the feed tank 42. As shown in FIGS. 1 and 2, the liquid trough 120 is adapted to project into a corresponding recess 122 formed in the lid 18 such that when the mechanism 34 is in the substantially vertical position the drainage 116 is disposed immediately above the liquid trough 120. As also shown, the wall 78 is slightly inclined rearwardly to assist the drainage of the liquid from the chamber 36.

The feeding troughs 18 are advantageously formed in a tray 124 which is removably inserted in the frame base portion 14, as best shown in FIG. 7. The tray 124 is provided with downwardly curved side flanges 126 (only one shown) each resting on a support member 128 fixed to the frame base portion 14. The tray 124 can thus be readily removed from the base portion 14 for convenient cleaning of the troughs 18. In order to further facilitate the cleaning of the troughs 18, these are provided with bottom side corners 130 which are rounded.

As it is apparent, the automatic animal feeder 10 illustrated is self-contained and does not require nor consume any external energy.

I claim:

1. An automatic animal feeder for automatically exposing feed at predetermined substantially regular intervals, which comprises:
   a frame having a base portion and an upwardly extending rear portion;
   at least two feeding troughs arranged side-by-side in said base portion and adapted to contain animal food;
   a lid associated with a respective one of said feeding troughs, said lid being movable between open and closed positions and normally biased toward said open position;
   a retention means associated with a respective lid for retaining same in said closed position;
   a liquid-operated release mechanism associated with a respective retention means, said release mechanism including a chamber with an inlet for receiving a liquid being operative to release said respective retention means when said liquid reaches a predetermined level in said chamber, said chamber having liquid discharge means for emptying same after use;
   a liquid feed tank adapted to contain said liquid, said feed tank having an outlet and being arranged in the rear portion of said frame to enable said liquid to flow by gravity through said outlet; and
   liquid supplying means interconnecting the tank outlet with the chamber inlet of a respective release mechanism for successively supplying said liquid to the respective chambers so as to successively release the associated retention means and cause successive opening of the associated lids, thereby exposing said animal food at predetermined substantially regular intervals corresponding to the time required for said liquid to fill a respective chamber, to said predetermined level.

2. An animal feeder as claimed in claim 1, wherein said lid is hinged to said frame for pivotal movement between an open substantially vertical position and a closed substantially horizontal position.

3. An animal feeder as claimed in claim 2, wherein said lid is hinged to said frame by means of a spring-loaded hinge normally biasing said lid toward said open substantially vertical position.

4. An animal feeder as claimed in claim 2, wherein said retention means and associated release mechanism are fixed to said lid so as to be movable therewith between said substantially vertical and horizontal positions.

5. An animal feeder as claimed in claim 4, wherein said liquid supplying means comprise a liquid directing valve having an inlet connected to said tank outlet and separate feed outlets each associated with a respective chamber inlet, and separate conduits each connecting a respective feed outlet to an associated chamber inlet, and wherein the chamber of a respective release mechanism when in said substantially vertical position is disposed at a height such as to prevent said liquid directing valve from supplying further liquid to said chamber.

6. An animal feeder as claimed in claim 5, wherein said liquid directing valve is formed with at least two liquid overflow compartments each provided with a respective feed outlet, the inlet of said liquid directing valve opening into one of said overflow compartments whereby to allow said liquid to first flow into said one compartment, through its respective feed outlet and the conduit connecting same to an associated chamber inlet so as to activate the release mechanism of an associated retention means and thereby cause the opening of the associated lid, said liquid being then prevented from further flowing through said conduit toward said associated chamber inlet such that a portion of the liquid in said conduit flows back to said one compartment to completely fill same and thereby cause additional liquid flowing from said tank outlet in the thus filled compartment to overflow into an adjacent compartment.

7. An animal feeder as claimed in claim 6, wherein said liquid directing valve has a chamber provided with at least one overflow partition wall arranged between opposite sidewalls and defining therewith said at least two overflow compartments.

8. An animal feeder as claimed in claim 4, further including means for recycling the liquid discharged from the chamber of a respective release mechanism by said liquid discharge means back to said feed tank.

9. An animal feeder as claimed in claim 8, wherein said liquid discharge means comprises a drainage port in liquid flow communication with the chamber of a respective release mechanism to allow said liquid to drain from said chamber when said respective release mechanism is in said substantially vertical position, and wherein said liquid recycling means comprise an inlet opening associated with a respective drainage port, said inlet opening being formed in a forwardly facing wall of said frame rear portion and being in liquid flow communication with said feed tank, and a liquid trough immediately below said inlet opening for channeling the liquid drained from said chamber through said inlet opening and into said feed tank, said liquid trough adapted to project into a corresponding recess formed in said lid such that when said respective release mechanism is in said substantially vertical position said drainage port is disposed immediately above said liquid trough.

10. An animal feeder as claimed in claim 9, wherein said lid is adapted to abut against said forwardly facing wall when in said open substantially vertical position, and wherein said forwardly facing wall is slightly inclined rearwardly to assist the drainage of said liquid from said chamber.

11. An animal feeder as claimed in claim 1, wherein said lid is elongated and is hinged at one end to said frame, and wherein said retention means and associated release mechanism are arranged at a free end of said lid.

12. An animal feeder as claimed in claim 1, wherein said liquid supplying means comprise a liquid directing valve having an inlet connected to said tank outlet and separate feed outlets each associated with a respective chamber inlet, and separate conduits each connecting a respective feed outlet to an associated chamber inlet.

13. An animal feeder as claimed in claim 12, further including a flow regulating valve connected between said tank outlet and said liquid directing valve for adjusting the flow rate of said liquid flowing from said feed tank to said liquid directing valve and thereby adjusting said predetermined intervals.

14. An animal feeder as claimed in claim 13, wherein said flow regulating valve is formed with a passageway allowing passage of said liquid from said feed tank to said liquid directing valve and includes a plunger movable in and out of said passageway to adjustably restrict the flow of said liquid passing through said passageway.

15. An animal feeder as claimed in claim 13, further including a pressure control valve connected between said tank outlet and said flow regulating valve for providing a substantially constant head of liquid upstream of said flow regulating valve.

16. An animal feeder as claimed in claim 15, wherein said tank outlet defines an outlet orifice and wherein said pressure control valve is formed with a float chamber and includes a double-arm lever pivotally mounted inside said float chamber, said double-arm lever having one arm connected to a float element and another arm provided with an orifice closing element engageable with said outlet orifice to normally close same, said other arm being pivotally movable in a direction away from said outlet orifice to open same in response to a downward displacement of said float element caused by a falling liquid level in said float chamber so as to admit additional liquid in said float chamber and thereby maintain a substantially constant liquid level.

17. An animal feeder as claimed in claim 1, wherein said retention means comprises a latch element engageable in a corresponding cavity formed in said frame.

18. An animal feeder as claimed in claim 17, wherein said liquid-operated release mechanism comprises a pivoted member fixed to said latch element and normally biased toward a latch disengaging position, and a double-arm lever pivotally mounted inside said chamber and having one arm connected to a float element and another arm engageable with said pivoted member to retain same in a latch engaging position with said latch element engaged in said cavity, said other arm being pivotally movable in a direction away from said member to disengage therefrom in response to an upward displacement of said float element caused by said liquid filling said chamber to said predetermined level, thereby causing said member to pivotally move to said latch disengaging position with said latch element being disengaged from said cavity.

19. An animal feeder as claimed in claim 18, wherein said member is pivotally mounted outside said chamber and said other arm of said double-arm lever extends exteriorly of said chamber through an opening to engage said member.

20. An animal feeder as claimed in claim 19, wherein said member is elongated and comprises a pivot mounting adjacent one end and a notch at a free end opposite said one end for receiving said other arm of said double-arm lever in said latch engaging position.

21. An animal feeder as claimed in claim 20, wherein said member is provided intermediate the ends thereof with a manually operated latch engaging pin for manually moving said member to said latch engaging position to engage said latch element in said cavity.

22. An animal feeder as claimed in claim 1, wherein said feeding troughs are formed in a tray which is removably inserted in the base portion of said frame.

23. An animal feeder as claimed in claim 22, wherein each said feeding trough has a peripheral edge and a seal member is arranged between the peripheral edge of a respective feeding trough and an associated lid so as to substantially hermetically seal said respective feeding trough when said associated lid is in said closed position.

* * * * *